(12) United States Patent
Rahman et al.

(10) Patent No.: US 7,490,302 B1
(45) Date of Patent: Feb. 10, 2009

(54) POWER GATING VARIOUS NUMBER OF RESOURCES BASED ON UTILIZATION LEVELS

(75) Inventors: Arifur Rahman, San Jose, CA (US); Sean W. Kao, Campbell, CA (US); Sathaki Das, Los Gatos, CA (US); Tim Tuan, San Jose, CA (US)

(73) Assignee: XILINX, Inc., San Jose, CA (US)

( * ) Notice: Subject to any disclaimer, the term of this patent is extended or adjusted under 35 U.S.C. 154(b) by 482 days.

(21) Appl. No.: 11/196,179

(22) Filed: Aug. 3, 2005

(51) Int. Cl.
*G06F 17/50* (2006.01)
(52) U.S. Cl. .............................. 716/1; 716/16; 716/18
(58) Field of Classification Search .................. 716/18, 716/1, 16
See application file for complete search history.

(56) References Cited

U.S. PATENT DOCUMENTS

| | | | | |
|---|---|---|---|---|
| 6,486,712 | B1 * | 11/2002 | Landry et al. .................. | 327/99 |
| 7,071,730 | B2 * | 7/2006 | Cordoba ...................... | 326/38 |
| 7,098,689 | B1 | 8/2006 | Tuan et al. | |
| 2005/0045919 | A1 * | 3/2005 | Kaeriyama et al. .......... | 257/211 |
| 2005/0091629 | A1 * | 4/2005 | Eisenstadt et al. ............. | 716/13 |
| 2006/0114025 | A1 * | 6/2006 | Frenkil et al. ................. | 326/81 |
| 2007/0016817 | A1 * | 1/2007 | Albonesi et al. ............ | 713/500 |
| 2007/0164785 | A1 * | 7/2007 | He .............................. | 326/41 |

OTHER PUBLICATIONS

Kaushik, R. et al., "Leakage Current Mechanisms and Leakage Reduction Techniques in Deep-SubMicrometer CMOS Circuits", Feb. 2003, pp. 305-327, vol. 91, No. 2, available from IEEE, 3 Park Avenue, 17th Floor, New York, NY 10016-5997.
De, Vivek et al., "Techniques for Leakage Power Reduction", *Design of High-Performance Microprocessor Circuits*, Sep. 2000, pp. 46-62, available from IEEE Books, IEEE, 3 Park Avenue, 17th Floor, New York, NY 10016-5997.
Davis, J. et al., "A Stochastic Wire-Length Distribution for Gigascale Integration (GSI)—Part I: Derivation and Validation," IEEE Transaction on Electron Devices, vol. 45(3), pp. 580-589, 1998.

* cited by examiner

*Primary Examiner*—Jack Chiang
*Assistant Examiner*—Suchin Parihar
(74) *Attorney, Agent, or Firm*—W. Eric Webostad (57) ABSTRACT

Power-gating circuit resources of an integrated circuit is described. The circuit resources are associated into sets responsive to utilization levels. The associating includes providing a first set of the sets, a first number of the circuit resources in the first set being associated with a first level of utilization. The associating also includes providing a second set of the sets, a second number of the circuit resources in the second set being associated with a second level of utilization. The first number is less than the second number responsive to the first level of utilization being greater than the second level of utilization. The circuit resources of the first set are commonly coupled to a reference voltage level via a first gating circuit. The circuit resources of the second set are commonly gated to the same or a different reference voltage level via a second gating circuit.

20 Claims, 10 Drawing Sheets

POWER GATING VARIOUS NUMBER OF RESOURCES BASED ON UTILIZATION LEVELS

FIELD OF THE INVENTION

One or more aspects of the invention relate generally to integrated circuits and, more particularly, to power gating various numbers of resources based on utilization levels.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

One such FPGA, the Xilinx Virtex™ FPGA, is available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable, such as integrated circuits having configurable resources.

For purposes of clarity, FPGAs are described below though other types of PLDs may be used. FPGAs may include one or more embedded microprocessors. For example, a microprocessor may be located in an area reserved for it, generally referred to as a "processor block." Some FPGAs may also be configured with one or more soft processors.

Heretofore, power-gated resources were not grouped in numbers according to utilization level. This lack of grouping meant that considerable circuitry overhead may be consumed, as some resources having low utilization levels were power gated in like numbers to other resources having high utilization levels. This in turn meant that additional overhead may be consumed, as infrequently used resources were power gated at a generally fine granularity as associated with more frequently used resources.

Accordingly, it would be desirable and useful to provide power gating of resources that consumes less overhead than power gating of the past, while having comparable current leakage levels.

SUMMARY OF THE INVENTION

One or more aspects of the invention generally relate to integrated circuits and, more particularly, to power gating various numbers of resources based on utilization levels.

An aspect of the invention is a method for power-gating circuit resources of an integrated circuit. The circuit resources are associated into sets responsive to utilization levels. The associating includes providing a first set of the sets, a first number of the circuit resources in the first set being associated with a first level of utilization. The associating also includes providing a second set of the sets, a second number of the circuit resources in the second set being associated with a second level of utilization. The first number is less than the second number responsive to the first level of utilization being greater than the second level of utilization. The circuit resources of the first set are commonly coupled to a first reference voltage level via a first gating circuit. The circuit resources of the second set are commonly coupled to a second reference voltage level via a second gating circuit.

Another aspect of the invention is a method for configuring an integrated circuit having programmable resources. Portions of the programmable resources are grouped into respective power domains. The programmable resources in each power domain of the power domains are commonly coupled to a reference voltage level via a gating circuit. The portions of the programmable resources have different numbers of the programmable resources responsive to an anticipated utilization level by type of the programmable resources constituting each of the power domains. A synthesized design is mapped using at least in part the portions of the programmable resources. The portions of the programmable resources mapped are placed. It is determined if at least one threshold is met responsive at least in part to the power domains used to provide configuration information for instantiating the synthesized design.

Yet another aspect of the invention is a method for configuring a programmable logic device having programmable routing resources. A synthesized design is mapped to logic resources of the programmable logic device. The logic resources mapped are placed in association with locations of the logic resources in the programmable logic device. Portions of the routing resources are grouped into respective routing power domains. The routing resources in each routing power domain of the routing power domains are commonly coupled to a first reference voltage level via a first gating circuit. The portions of the routing resources have different numbers of the routing resources responsive to an anticipated utilization level by type of the routing resources constituting each of the routing power domains. The logic resources mapped and placed are routed using at least in part the portions of the routing resources. It is determined if a first threshold is met at least partially responsive to the routing power domains associated with the routing resources used in the routing. Accordingly, configuration information for instantiating the synthesized design in the programmable logic device is provided.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIGS. 2C-1 through 2C-3 are schematic diagrams depicting respective exemplary embodiments of power-gated granularities for multiplexers.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same or similar items; however, in alternative embodiments the items may be different.

Figure 1:
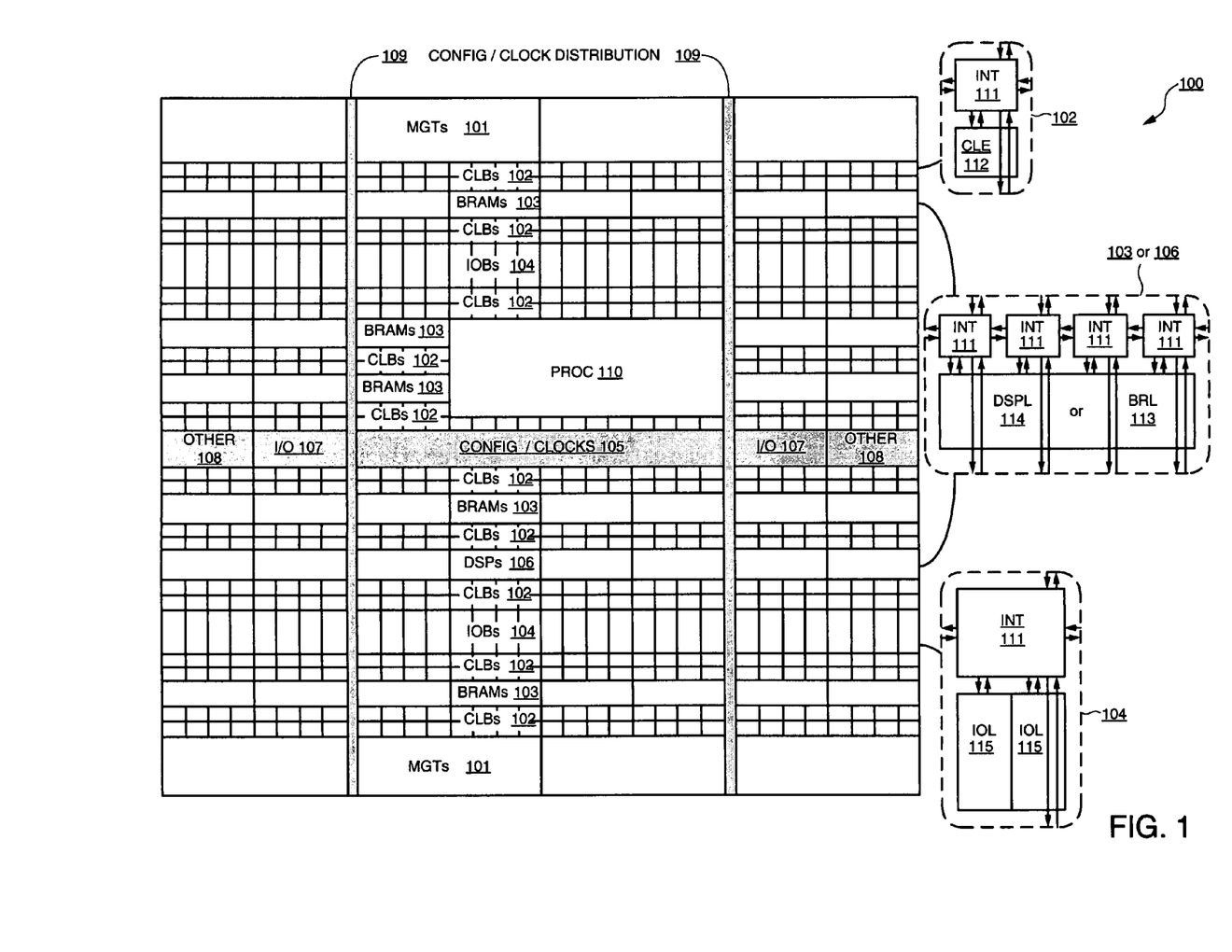
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include one or more dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4™ FPGA from Xilinx of San Jose, Calif.

Figure 2A:
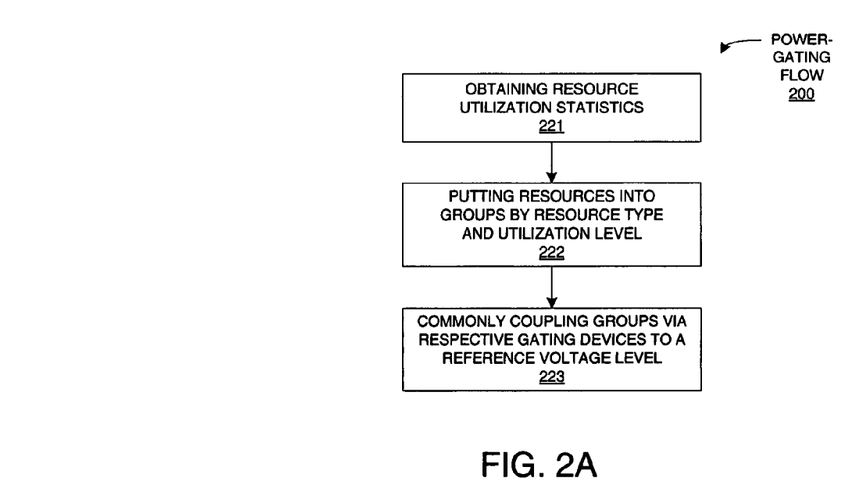
FIG. 2A is a high-level flow diagram depicting an exemplary embodiment of a power-gating flow.

FIG. 2A is a high-level flow diagram depicting an exemplary embodiment of a power-gating flow 200. At 221 of power-gating flow 200, resource utilization statistics are obtained. In general, utilization statistics may indicate the how frequently a resource is used, the type of use of the resource, or other factors indicating how a particular resource or groups or resources are being used. Statistics obtained at 221 may include data regarding utilization of routing resources and logic resources of an integrated circuit having programmable logic, such as FPGA 100 of FIG. 1. Notably, programmable routing resources or programmable interconnection resources may include logic and memory cell for the purposes of providing programmability. Moreover, programmable logic resources may include routing between logic resources. Accordingly, the terms "programmable routing resource" and "programmable logic resource" respectively refer to a principal function, and not to particular circuitry used. Programmable routing resources and programmable logic resources may be considered subsets of programmable circuit resources, which is a subset of circuit resources.

In FPGAs, depending on the design instantiated, a significant portion of the programmable logic and interconnection resources may not be utilized as part of the instantiation. Accordingly, depending on the type of application, average utilization factors for various programmable logic and interconnection resources may be determined. For example, for an application, average utilization factors of various multiplexers for a Spartan 3 FPGA available from Xilinx, Inc. of San Jose, Calif. were determined as set forth in Table 1 below.

Notably, Table 1 was determined using a set of benchmark circuits of varying design complexities. However, as should be apparent, the benchmark circuits may vary from application to application, and thus Table 1 is merely an example of use of a set of benchmark circuits resulting in a set of average utilization factors for selected programmable interconnection multiplexers.

TABLE 1

| Resources | Utilization Factor |
|---|---|
| Double Multiplexer | 43% |
| Hex Multiplexer | 12% |
| Long Multiplexer | 3% |
| Input Multiplexer | 38% |
| Output Multiplexer | 31% |

Thus, as indicated at 222, resources may be put into groups by type and an associated utilization level, as in Table 1. For example, double input multiplexers are in a separate group from hex input multiplexers. Notably, all or selected programmable logic resources, as well as all or selected programmable interconnect resources, may be associated with a respective utilization factor. However, for purposes of clarity by way of example and not limitation, the example of Table 1 is used for further description, although it will be appreciated by one of ordinary skill in the art that other resources may be selected, and one or more of the example resources may be omitted.

From Table 1, it should be understood that resources having a utilization factor below a certain threshold may be power gated in order to reduce leakage current and thus reduce standby current. In other words, power consumption may be reduced by power gating resources having a lower utilization factor with a first granularity and power gating resources having a higher utilization factor with a second granularity, wherein the first granularity is greater than the second granularity. Accordingly, power-gating transistors may be employed as described below in additional detail.

At 223, groups of resources grouped at 222 are commonly coupled to a reference voltage level via a switching device, such as a pass transistor. These groups of resources may vary in number according to their respective utilization levels or factors. Notably, utilization levels, or packing levels, may be associated with respective costs, as described below in additional detail. Examples of a reference voltage level include Vdd, Vcc, Vss, ground, or any other voltage level used as a reference voltage.

Figure 2B:
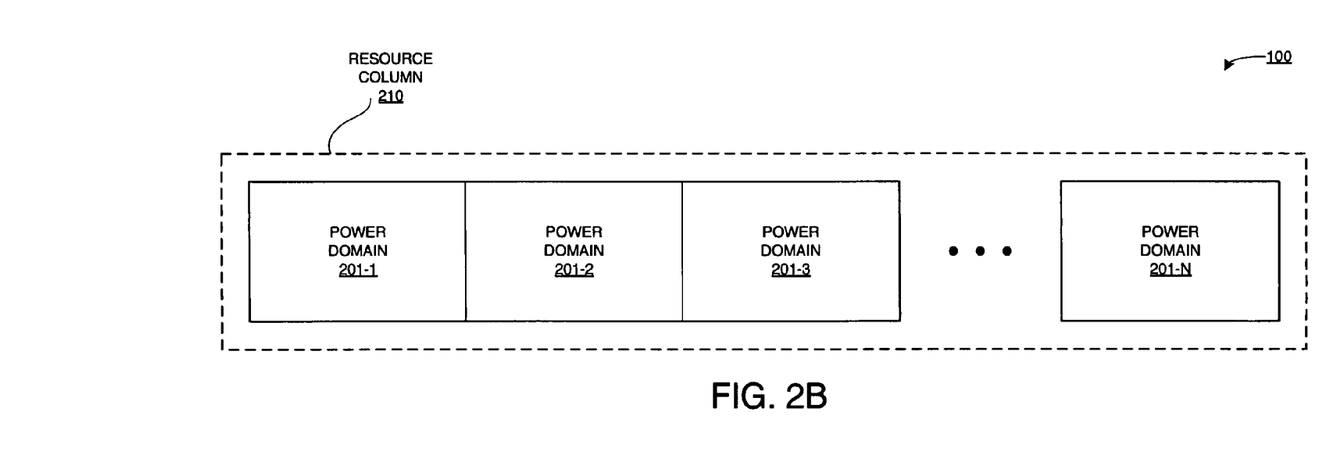
FIG. 2B is a high-level block diagram depicting an exemplary embodiment of a portion of the FPGA of FIG. 1.
Figure 2C:
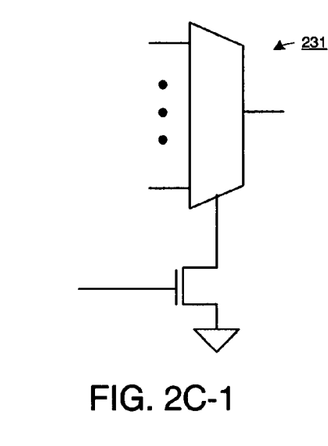
Figure 2C:
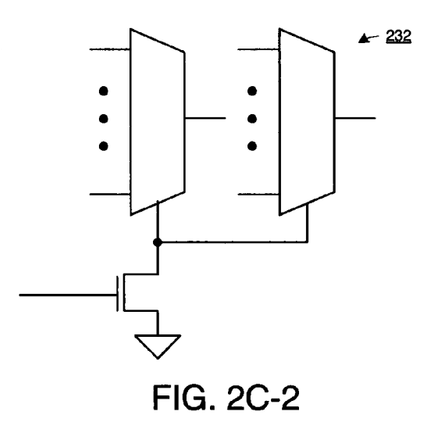
Figure 2C:
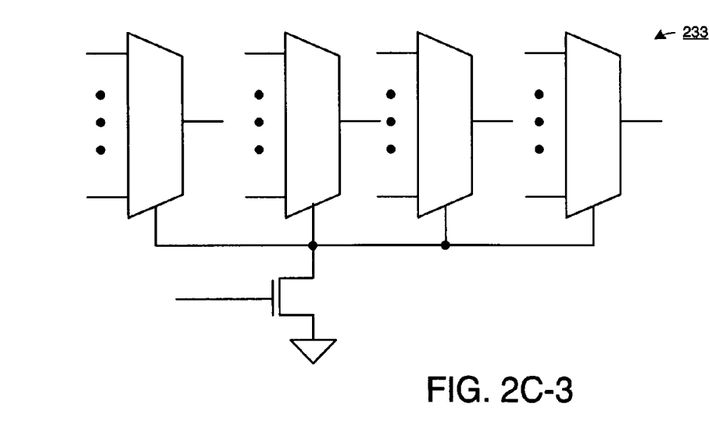

FIG. 2B is a high-level block diagram depicting an exemplary embodiment of a portion of FPGA 100 of FIG. 1. The portion illustratively shown in FIG. 2B is a resource column 210, namely a column of resources of FPGA 100 of FIG. 1. These resources are grouped according to type and utilization level into respective power domains 201-1 through 201-N, for N a positive integer greater than one. Thus, it should be appreciated that by grouping resources and commonly coupling those resources to a reference voltage level via a pass transistor, N respective power domains may be defined, for example as previously described with respect to step 222 of power-gating flow 200.

FIGS. 2C-1 through 2C-3 are schematic diagrams depicting respective exemplary embodiments of power-gated granularities 231, 232 and 233 for multiplexers. Power-gated granularity 231 is for one multiplexer. Power-gated granularity 232 is for two multiplexers, and power-gated granularity 233 is for four multiplexers. These are merely examples to illustrate respective levels of power-gating granularities, as well as a type of logic resources, that may be used.

Figure 3A:
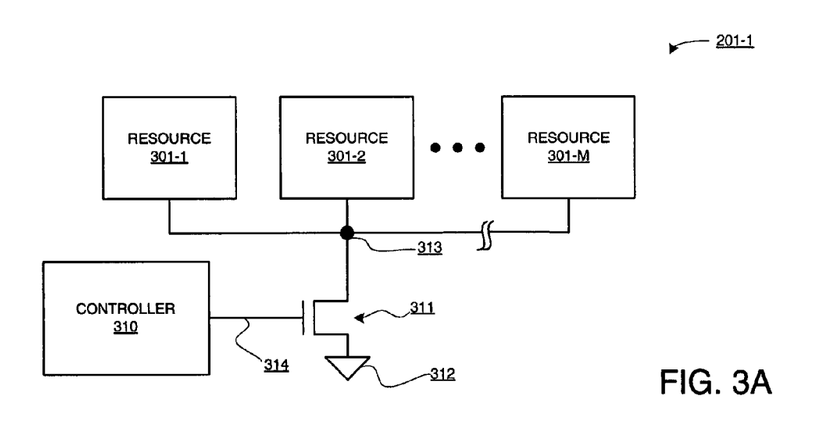
FIG. 3A is a high-level block diagram depicting an exemplary embodiment of a power domain.

FIG. 3A is a high-level block diagram depicting an exemplary embodiment of a power domain 201-1 of FIG. 2B. Power domain 201-1 includes resources 301-1 through 301-M, for M an integer equal to or greater than one, having their ground terminals all commonly coupled at node 313. A controller 310 is used to provide a control gate voltage 314 to a gate of transistor 311. A drain terminal of transistor 311, which in this example is an NMOS transistor, is coupled to node 313 and a source terminal of transistor 311 is coupled to ground 312. Accordingly, node 313 is a virtual ground node responsive to control gate voltage 314. Thus, when control gate voltage 314 is asserted, NMOS transistor 311 electrically couples node 313 to ground 312. However, when control gate voltage 314 is not asserted, NMOS transistor 311 is in a substantially electrically non-conductive state. When NMOS transistor 311 is in a substantially non-conductive state, node 313 is electrically de-coupled from ground 312. By electrically de-coupling node 313 from ground, each of resources 301-1 through 301-M is put into a non-operative or standby state. In such a non-operative state, leakage current, and thus standby current, may be reduced in contrast to when such resources 301-1 through 301-M are in an operative state, namely when control gate voltage 314 is asserted. Notably, an NMOS transistor 311 is used in this exemplary embodiment for pulling voltage down to ground level to provide a virtual ground, as it is well-known that NMOS devices are better for pulling voltage down than PMOS devices.

Figure 3B:
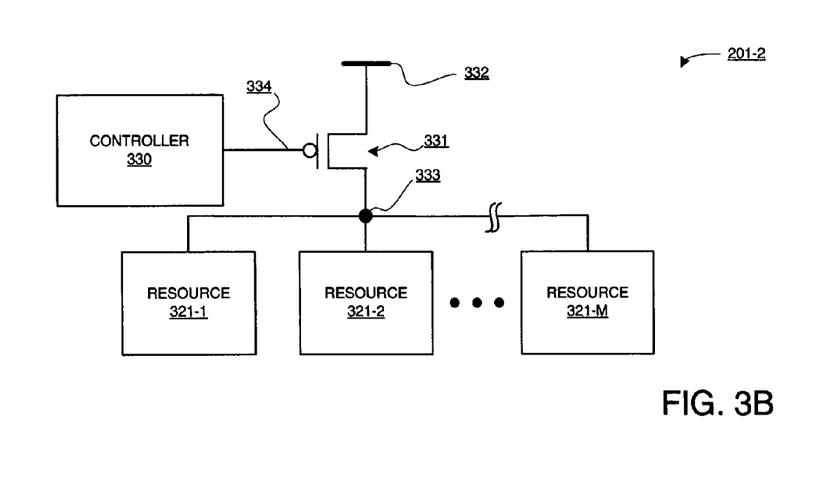
FIG. 3B is a high-level block diagram depicting an exemplary alternative embodiment of a power domain.

FIG. 3B is a high-level block diagram depicting an exemplary embodiment of a power domain 201-2 of FIG. 2B. Power domain 201-2 includes resources 321-1 through 321-M. Resources 321-1 through 321-M have their supply power input terminals commonly coupled to node 333. Controller 330 is configured to provide a control gate voltage 334 to transistor 331. Accordingly, a gate of transistor 331 is coupled to controller 330. A source terminal of transistor 331 is coupled to a supply power voltage 332, such as Vdd, and a drain terminal of transistor 331 is coupled to node 333. In this exemplary embodiment, transistor 331 is a PMOS transistor configured to pull up voltage at node 333 to at least approximately the voltage level of supply voltage 332 responsive to assertion of control gate voltage 334. As is well known, in contrast to assertion of control gate voltage 314, control gate voltage 334 is asserted at a logic low level for causing PMOS transistor 331 to be in a substantially electrically conductive state. In a substantially electrically conductive state, transistor 331 couples supply voltage 332 to supply voltage node 333, and thus provides a virtual power supply node 333. In a non-operating mode with respect to resources 321-1 through 321-M, controller 330 does not assert control gate voltage 334 in order to provide a logic high voltage level to a gate of transistor 331. Thus, in a non-operating mode, node 333 is electrically de-coupled from supply voltage 332 such that resources 321-1 through 321-M do not operate. In a non-operating state, resources 321-1 through 321-M consume less leakage current than in an operating state, and accordingly standby power consumption may be reduced.

In some embodiments, controller 310 may be a memory cell, such as a configuration memory cell, that is programmed to either enable or disable transistor 311. It will be appreciated by those of ordinary skill in the art that other forms of controller 310, such as a logic circuit, may be used. Furthermore, it will be appreciated by those of ordinary skill in the art that an implementation for controller 330 of FIG. 3B may be similar to that of 310, though configured for gating a PMOS transistor instead of an NMOS transistor.

It should be appreciated that utilization statistics may be used to determine granularity of power gating for particular types of resources, including programmable logic resources and interconnection resources. However, there is a trade-off between fine and coarse granularity for power-gated resources. On the one hand, a finest power-gating granularity may lead to a maximum reduction in leakage current, but a finest power-gating granularity may lead to a significantly higher overhead and design complexity. On the other hand, a coarsest or non-existent power-gating granularity may lead to little to no overhead and reduced design complexity, but a coarsest or non-existent power gating granularity may lead to a significantly high leakage current.

However, as disclosed herein, power gating may be used where a level of power-gating granularity is selected responsive to utilization statistics. Accordingly, less design overhead than using the finest-granularity power gating may be achieved with comparable reduction in leakage current. Alternatively, in some instances to slightly increasing design overhead by using finer-granularity power gating may achieve significant reductions in leakage current. Thus, relatively fine power-gating granularity is used for resources with higher utilization factors, and relatively coarse power-gating granularity is used for resources with lower utilization factors. Notably, there may be a range of granularities responsive to utilization factors for different types of resources. Thus, by using a pass transistor such as transistors 311 and 331 of FIGS. 3A and 3B, respectively, coupled in series with a circuit or a group of circuits, power gating is facilitated, which may be used to reduce leakage current. In an operational mode, the power-gating or pass transistor is controlled to be in a substantially electrically conductive state, thereby conducting a reference voltage level to the circuit or group of circuits being power gated by such pass transistor. In a standby or non-operational mode, the power-gating transistor is controlled to be in a substantially electrically non-conductive state. Thus, it should be appreciated that power gating may be used to electrically decouple a reference voltage, such as a power supply voltage or a ground reference voltage, from a circuit or routing resource to reduce or otherwise limit leakage current.

Thus, by power gating resources responsive to utilization level, the amount of circuitry used to control whether to put such power-gated resources in an operational mode or a standby mode may be reduced. Accordingly, one may determine a design space where the benefits of power gating may be achieved with a reduced or minimal design overhead.

Figure 3C:
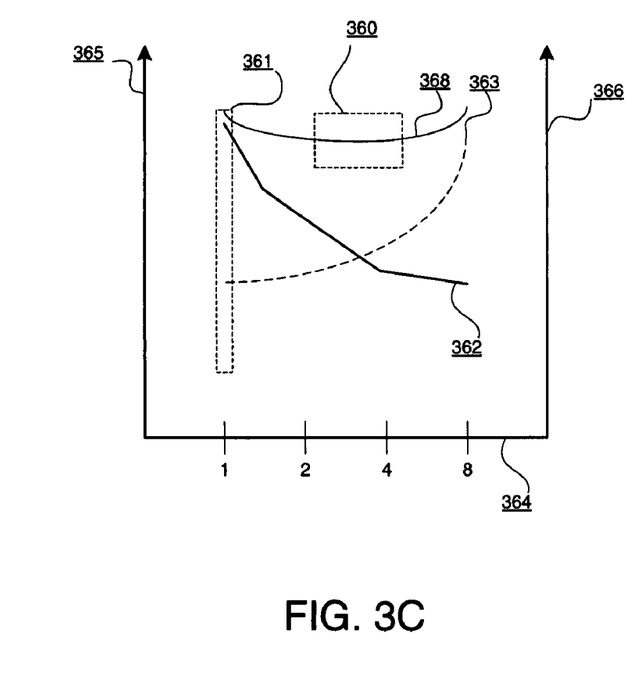
FIG. 3C is a graphical diagram depicting a target design space for respective utilization factors and resources associated with a number of multiplexers used in an exemplary design.

FIG. 3C is a graphical diagram depicting a target design space 360 for the utilization factors and resources as listed in Table 1. Axis 364 lists a number of resources, multiplexers in this example, per power-gated group; axis 365 indicates relative standby power; and axis 366 indicates relative design overhead. As is illustratively shown, there may be a minimum standby power space 361 which may or may not overlap with design space 360. However, multiplication of design overhead line 362 and relative standby power dashed line 363 provides a line 368 which runs through or lies in design space 360.

As a result, an optimal granularity for power gating may be different for various types of resources, including programmable resources. Thus, in FIG. 3C, where the relative power of different types of multiplexers is plotted as a function of granularity of the grouping of such different types of multiplexers, a design space 360 may be identified. In FIG. 3C, the same design cost is assumed for all multiplexers for convenience, though different design costs may be associated with different types of multiplexers. Notably, the results as illustratively shown in FIG. 3C are based on placement and routing using benchmark circuits as implemented in a Spartan 3 FPGA available from Xilinx, Inc. of San Jose, Calif. However, results may vary depending on the integrated circuit having programmable resources used, as well as the benchmark circuits used.

Figure 3D:
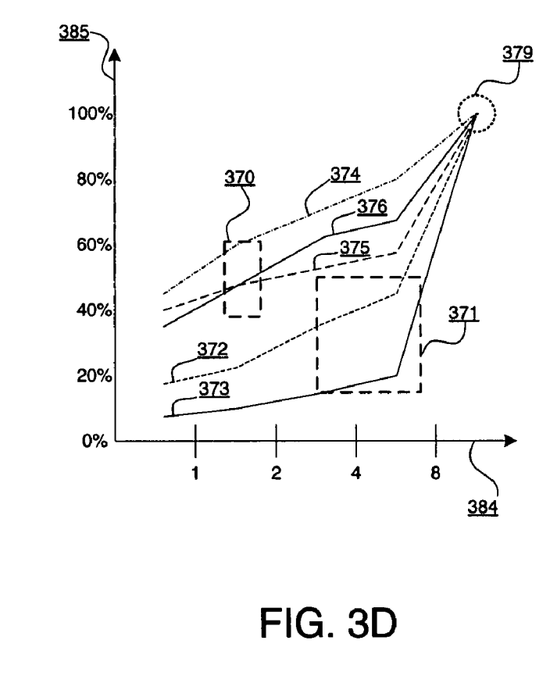
FIG. 3D is a plot of relative values of standby power and design overhead as a function of granularity of power-gating circuits for the exemplary design associated with FIG. 3C.

FIG. 3D is a plot of relative values of standby power and design overhead as a function of granularity of power-gating circuits for the example of Table 1. Axis 384 indicates grouping granularity, and axis 385 indicates a percentage of relative standby power, including design overhead. Regions of target power-gating granularity are illustratively shown as regions 370 and 371 for the different types of multiplexers.

Notably, the relative total power of hex and long multiplexers, as generally indicated by lines 372 and 373 respectively, is smaller than a non-power-gated design, generally indicated at 379, for groupings of one, two, four, and eight multiplexers. However, the relative total power consumed by double, input, and output multiplexers, and generally indicated by lines 374, 375, and 376, respectively, is comparably higher for similar grouping sizes. This may be expected as hex and long multiplexers have low utilization factors in contrast to double, input, and output multiplexers. Because the relative power of hex and long multiplexers is much smaller than their non-power-gated version, a coarse power-gating granularity is suitable for such multiplexers in order to minimize or reduce design overhead. In contrast, a finer power-gating granularity is suitable for double, input, and output multiplexers. In other words, for programmable resources with a relatively low utilization factor, a generally coarse power-gating granularity may be used, and for programmable resources with a relatively high utilization factor, a generally fine power-gating granularity may be used.

Using the above-described power-gating technology, software design tools may be modified to incorporate power gating. Such software may be configured to have two modes for which optimization diverges. A low leakage power mode may be used to minimize or reduce power consumption according to a cost function associated with power consumption. A high performance mode may be used to minimize or reduce delay penalty incurred due to simultaneous switching activity of grouped resources according to a cost function associated with an incremental increase in delay. For a low leakage power mode, a cost function may be generalized with controllable dependencies. Some of these dependencies or variables may be set according to the FPGA architecture and others may be set by a software tool for mapping and placement of logic resources. For example, a generalized total power function may be set equal to a function of the mapped and placed logic resources for a design, placement routing, FPGA architecture, power-gated resource power PG, and non-power-gated resource power. In this relationship, the total power may be the total leakage power of an FPGA, the mapped and placed resources may be all the resources used in instantiating the design, the placement routing may be where those resources are placed and routed, the architecture may be how combinations of resources may be power gated, the power-gated resource power may be the leakage power of power-gated resources, and the non-power-gated resource power may be the leakage power of non-power-gated resources. This cost function may be directed toward a minimum by reducing the amount of unused blocks that cannot be power-gated. Thus, packing as many used resources as possible into power-gated blocks results in an increase in the number of power-gated blocks having a packing percentage above a threshold. Notably, this function may provide a reduction in leakage power provided the number of resources used does not increase. In other words, the most efficient use of a group of power-gated resources is to have all such power-gated resources in that group utilized. The least efficient use of a group of power-gated resources of more than one is to have only one of the resources used, and have the remaining resources in the group unused. The other most efficient use of a group of power-gated resources is to have all such resources unused such that the pass gate of the transistor may be switched off.

Alternatively, another cost function may be to obtain the lowest leakage resources meeting functional and timing constraints. For example, suppose routing resources may be long, short, or medium. Now suppose, routing from a source to a sink has two possible routing options, namely one routing option where a short, long, and another short routing resource are used, and another routing option where two medium routing resources are used. In this very simple example, the medium resources may be used rather than the short, long, and short resources, as the former involves only one power domain and the latter involves two power domains.

Figure 4A:
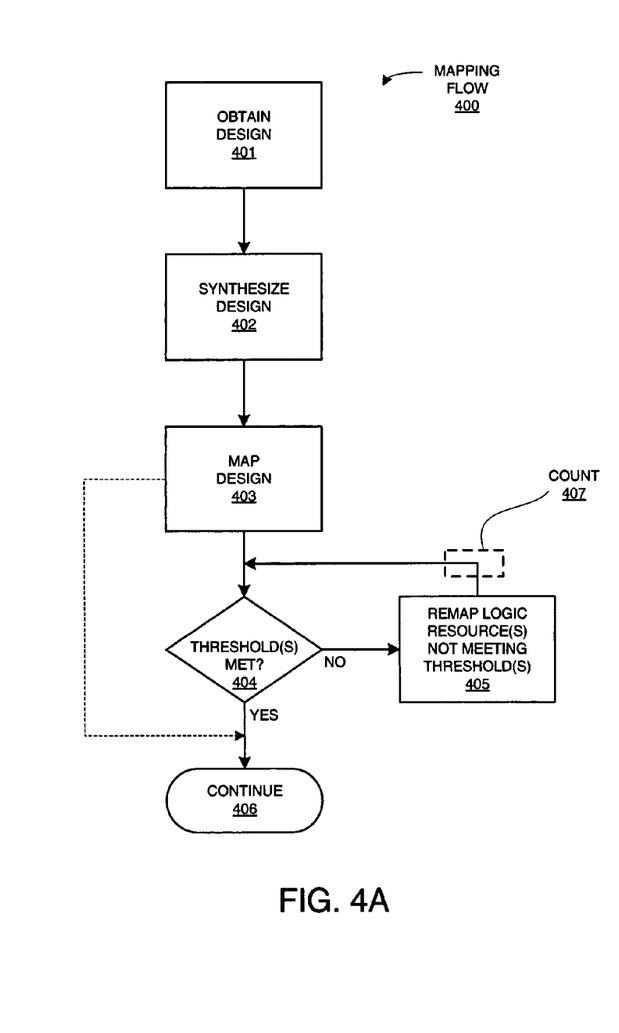
FIG. 4A is a high-level flow diagram depicting an exemplary embodiment of a mapping flow.

FIG. 4A is a high-level flow diagram depicting an exemplary embodiment of a mapping flow 400. At 401, a design to be instantiated in an FPGA is obtained. At 402, the design is synthesized to provide, for example, a hardware description language version of the design. At 403, the synthesized design is mapped. Thus, resources associated with the design are allocated to instantiate the design.

At 404, it is determined if one or more thresholds are met. Again, these thresholds may be associated with packing constraints of power-gated resources. For example, if the threshold were at least 50% or more of the resources in a group must be mapped, then at 405 those resources in each power domain not meeting the threshold packing level may be remapped to resources in other power domains. Notably, packing may vary from application to application, and thus a user may specify a different packing threshold for reducing standing power. Notably, it should be appreciated that in many instances there are different types of circuits that may be used to provide functionality to be instantiated. For example, a design may specify a four-input multiplexer. It may be that use of a four-input multiplexer would necessitate activating a power domain in which only one of a number of four-input multiplexers are used in instantiating the design. However, there may be six-input multiplexers available in power domains already having met a packing threshold. Accordingly, rather than using a four-input multiplexer, a six-input multiplexer may be a better choice with respect to power usage as removal of use of the four-input multiplexer means the entire power domain may be put into a standby mode. Thus, remapping at 405 may involve not only reallocating the same resource, but associating different resources to provide a same function. Once the one or more thresholds are met at 404, or optionally after a count 407 has been reached for a maximum number of optimization remapping cycles, mapping flow may continue at 406 for placement and routing of a design. Notably, one of the thresholds at 404 may be to check to see if count 407 has been met, in which event mapping flow 400 may continue at 406. Notably, optionally mapping flow 400 may continue at 406 immediately after 403, and thus no power-gating packing optimization need be done during mapping flow 400, but may be deferred to a placement flow 440 of FIG. 4B. Alternatively, power-gating packing optimization may be done during mapping flow 400 and no power-gating optimization would be done during placement flow 440 of FIG. 4B. Alternatively, power-gating packing optimization and power-gating utilization optimization may respectively be done as part of both mapping flow 400 and placement flow 440 of FIG. 4B.

Figure 4B:
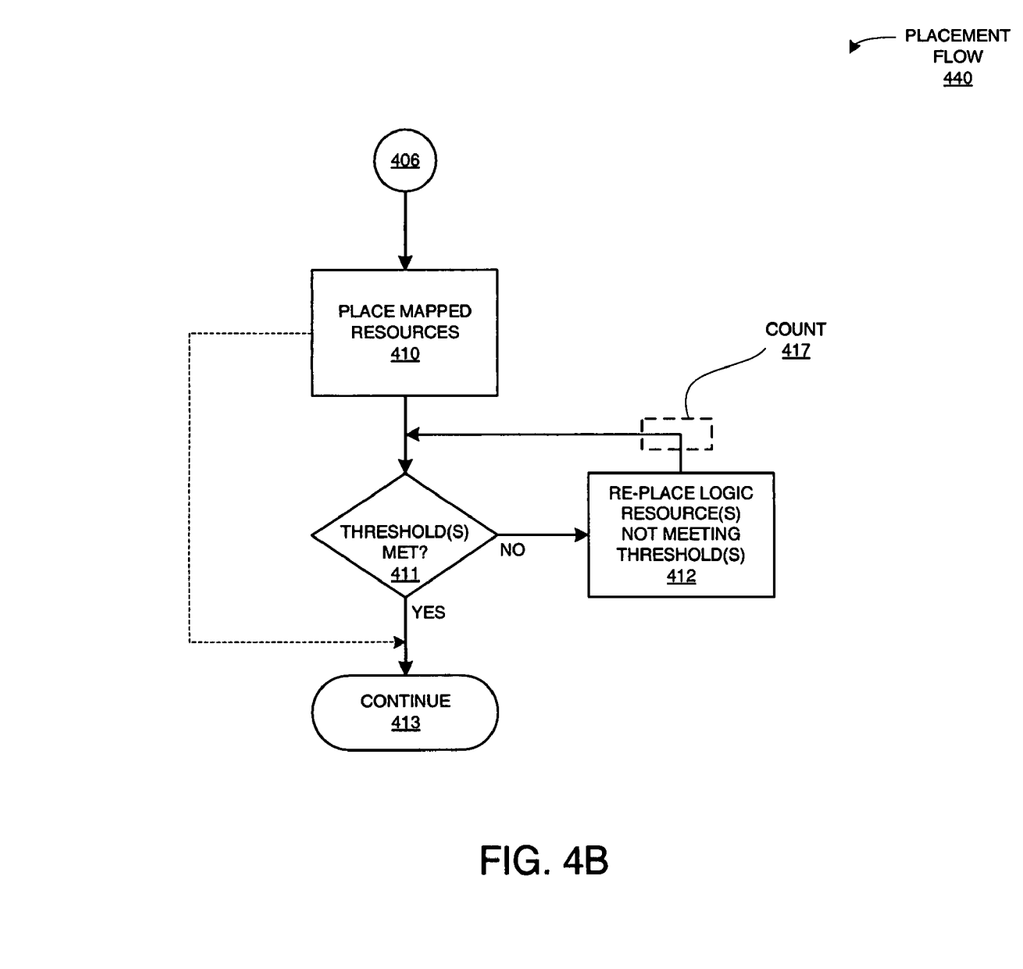
FIG. 4B is a high-level flow diagram depicting an exemplary embodiment of a placement flow.
Figure 4C:
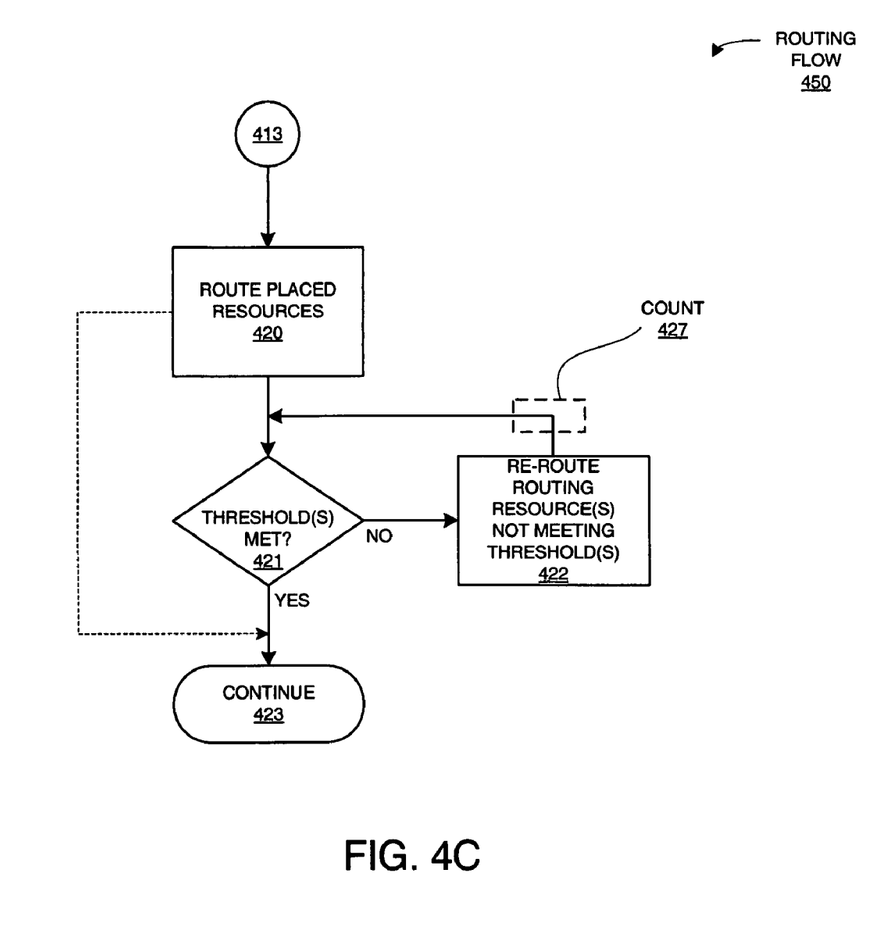
FIG. 4C is a high-level flow diagram depicting an exemplary embodiment of a routing flow.

FIG. 4B is a high-level flow diagram depicting an exemplary embodiment of a placement flow 440. Placement flow 440 may proceed from location 406 of mapping flow 400. After mapping at 403 or 406, mapped resources may be placed at 410. At 411, it may be determined if one or more placement thresholds have been met. Notably, placement and routing conventionally go together and in this context at 410 resources may be placed and routed. However, for purposes of clarity by way of example and not limitation, placement and routing have been separated out into placement flow 440 and routing flow 450, which is described in further detail below, as placement is for logic resources and routing is for routing resources. Furthermore, placement and routing have been separated out because a user may only want to reduce standby power consumption of logic resources and not routing resources with respect to leakage power, or vice versa. However, it should be appreciated that both logic resources and routing resources may be configured for leakage power using power gating as described herein.

If one or more thresholds are not met at 411, logic resources not meeting such thresholds may be re-placed at 412. In contrast to substituting one resource for another, placement may involve locating available resources in other regions of an FPGA more proximate to one another, where such resources are part of unused resources of a group of power-gated resources. After one or more power domain utilization thresholds are met at 411, or optionally after count 417 has cycled a maximum number of times, placement flow 440 may continue at 413. Notably, one of the thresholds at 411 may be to check to see if count 417 has been met, in which event placement flow 440 may continue at 413. Notably, optionally placement flow 440 may continue at 413 immediately after 410, and thus no power-gating utilization optimization need be done during placement flow 440, as one may rely upon one or both of power-gating packing optimization done during mapping flow 400 of FIG. 4A, as previously described, or the power-gating utilization optimization done during routing flow 450 of FIG. 4C.

FIG. 4C is a high-level flow diagram depicting an exemplary embodiment of a routing flow 450. Routing flow 450 may proceed from location 413 of placement flow 440. At 420, placed resources are interconnected using routing resources. At 421, it is determined whether one or more power domain utilization thresholds are met. If such one or more thresholds are not met, then re-routing may be done at 422 with respect to those routing resources in a power domain not meeting a threshold. Again, thresholds may be associated with a percentage of utilization of resources within each of the power domains used for routing. Thus, with respect to routing resources used to route placed logic resources, it may be determined whether other routing resources may be used to increase utilization of the power-gated routing resources. After one or more utilization thresholds for routing resources are met at 421, or optionally after maximum count 427 for re-routing has been reached, routing flow 450 may continue at 423. Notably, one of the thresholds at 421 may be to check to see if count 427 has been met, in which event routing flow 450 may continue at 423. Notably, optionally routing flow 450 may continue at 423 immediately after 420, and thus no power-gating utilization optimization need be done during routing flow 450, but may rely upon one or both of power-gating packing optimization done during mapping flow 400 of FIG. 4A or power-gating utilization optimization done during placement flow 440 of FIG. 4B.

As is known, there are software tools which minimize a cost function associated with an increase in delay, especially with respect to what is known as "critical paths." An increase in delay may be due to power gating as associated with a finite current sourcing from power-gating transistors. Furthermore, multiple switching events in a single power-gated group may increase transient signal delay owing to the limited amount of current that may pass through the power-gating transistor. This transient signal delay is generally dependent on the number of switching events within a power-gated domain, as well as the difference in timing between such switching events.

Continuing the example above with respect to Table 1, assuming that only multiplexers are power-gated, a cost function for an incremental delay in a "critical path" may be a function of each delay owing to a switching event. Each delay owing to a switching event may be associated with one or more of a design, timing, and multiplexers used for such "critical path." The design dependency of these switching events may be associated with the number of inputs and outputs of each of the power domains used as part of the critical path resources. There may be a temporal dependency for timing these circuits owing to propagation delay affecting switching events. The multiplexers used may be the number and type of multiplexers used in each power-gated group that receive and conduct switching events. Thus, the delay in the critical path may be the total increase in delay due to power gating. Each incremental delay due to a switching event may be a time difference between switching events in each power domain in a critical path.

Thus, a minimum delay increase in the critical path may be obtained by attempting to maximize the time difference between switching events in each power-gated group associated with such critical path. This maximization in order to obtain a minimum increase in the total additional delay may include using multiple resources in a same power-gated group only responsive to when it is determined that inputs to those resources will arrive significantly far enough apart to have minimal impact on an increase in delay owing to switching events associated therewith. However, resources in a power-gated group may have to be reallocated to avoid simultaneous or near-simultaneous switching events in order to reduce the incremental delay associated with such switching. This reallocation may result in a lowering of the utilization level within a power-gated group.

Figure 4D:
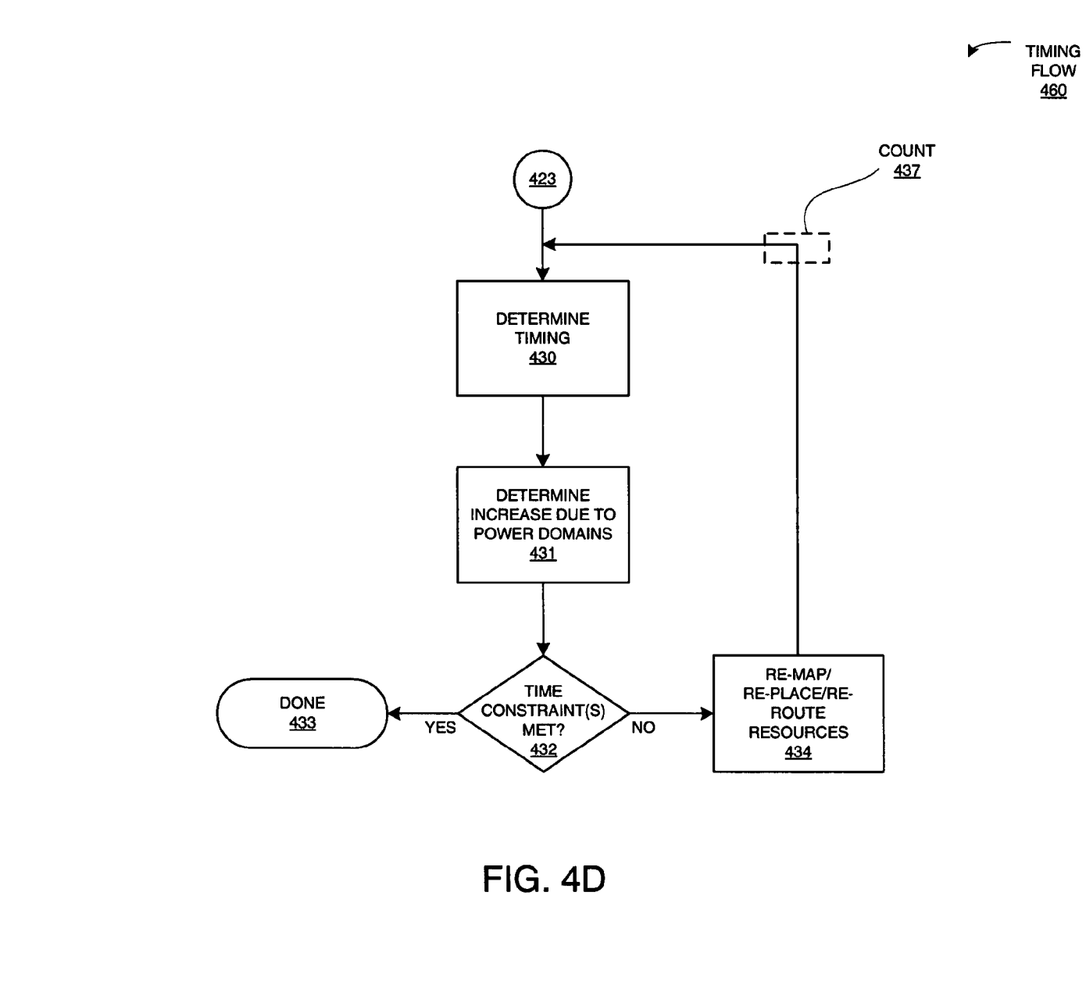
FIG. 4D is a high-level flow diagram depicting an exemplary embodiment of a timing flow.

FIG. 4D is a high-level flow diagram depicting an exemplary embodiment of a timing flow 460. Timing flow 460 may proceed from location 423 of routing flow 450 of FIG. 4C. At 430, timing of an instantiated design is determined. At 431, increase due to use of power domains, namely power-gated groups, in an instantiated design is determined. At 432, it is determined if timing constraints associated with the design, including critical path timing, have been met. If such timing constraints have not been met, an additional delay associated with use of power domains as determined at 431 may be associated with such paths. Resources may be re-mapped, re-placed, or re-routed at 434 in order to reduce the incremental delay associated with using power-gated resources. Again, this re-mapping, re-placing, or re-routing may involve a lower utilization level of resources within a power domain.

Once such one or more timing constraints are met at 432, or optionally once a maximum count 437 for meeting timing constraints has been reached, timing flow 460 may finish at 433. Notably, one of the thresholds at 432 may be to check to see if count 437 has been met, in which event timing flow 460 may end at 433.

Figure 5:
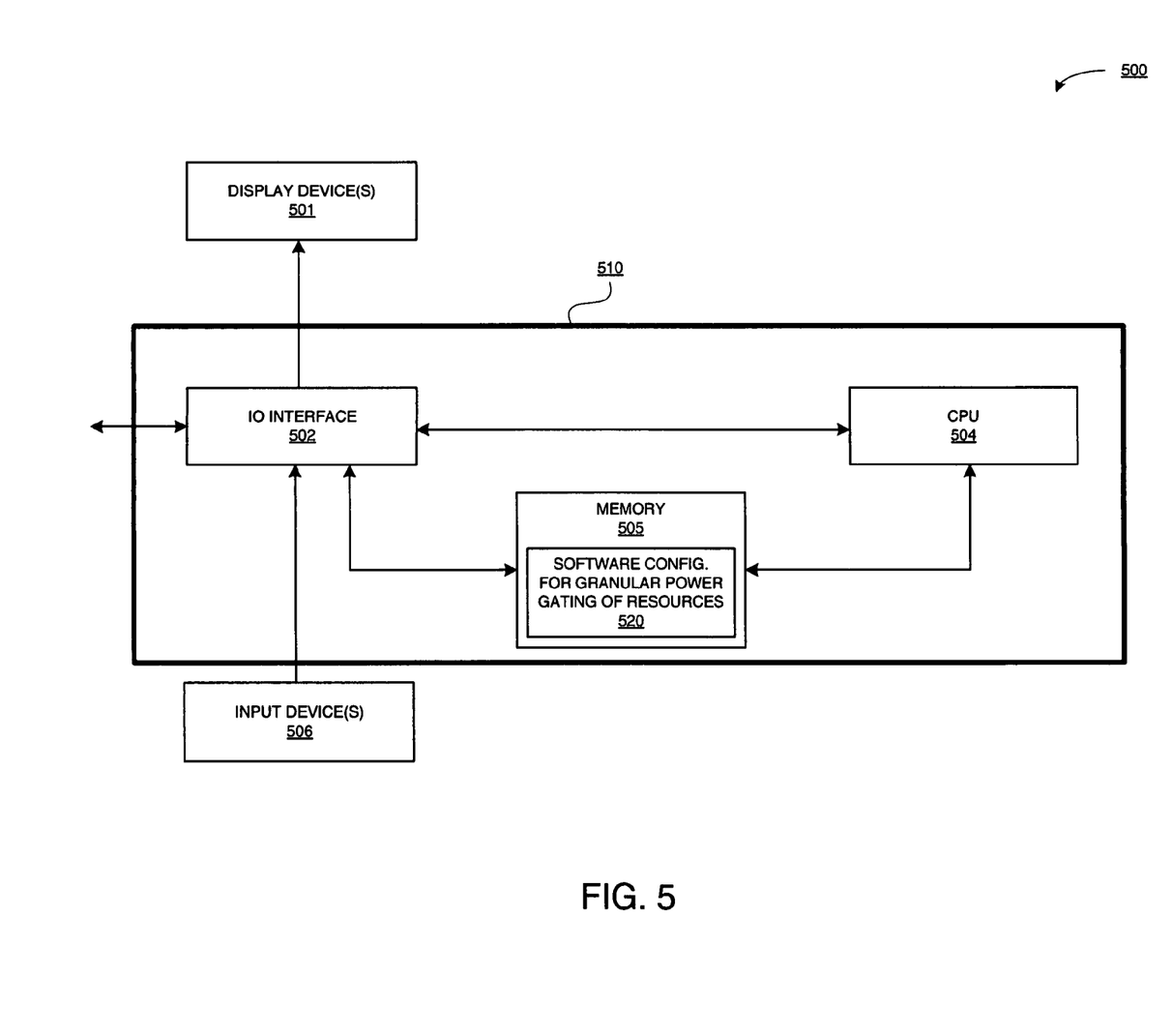
FIG. 5 is a high-level block diagram of an exemplary embodiment of a computer system.

FIG. 5 is a high-level block diagram of an exemplary embodiment of a computer system 500. Computer system 500 may include a programmed computer 510 coupled to one or more display devices 501, such as Cathode Ray Tube ("CRT") displays, Plasma displays, Liquid Crystal Displays ("LCD"), and to one or more input devices 506, such as a keyboard and a cursor pointing device. Other known configurations of computer system 500 may be used.

Programmed computer 501 may be programmed with a known operating system, which may be OS/2, Mac OS, Java Virtual Machine, Linux, Solaris, Unix, or a Windows operating system, among other known platforms. Programmed computer 501 includes a central processing unit (CPU) 504, memory 505, and an input/output ("IO") interface 502. CPU 504 may be a type of microprocessor known in the art, such as available from IBM, Intel, and Advanced Micro Devices for example. Support circuits (not shown) may include conventional cache, power supplies, clock circuits, data registers, and the like. Memory 505 may be directly coupled to CPU 504 or coupled through IO interface 502. At least a portion of an operating system may be disposed in memory 505. Memory 505 may include one or more of the following: random access memory, read only memory, magneto-resistive read/write memory, optical read/write memory, cache memory, magnetic read/write memory, and the like, as well as signal-bearing media as described below.

IO interface 502 may include chip set chips, graphics processors, and daughter cards, among other known circuits. An example of a daughter card may include a network interface card ("NIC"), a display interface card, a modem card, and a Universal Serial Bus ("USB") interface card, among other known circuits. Thus, IO interface 502 may be coupled to a conventional keyboard, network, mouse, display printer, and interface circuitry adapted to receive and transmit data, such as data files and the like. Notably, programmed computer 510 may be coupled to a number of client computers, server computers, or any combination thereof via a conventional network infrastructure, such as a company's Intranet and/or the Internet, for example, allowing distributed use for interface generation.

Memory 505 may store all or portions of one or more programs or data to implement processes in accordance with one or more aspects of the invention to provide a software tool 520 configured for granular power gating of resources, as described herein. Additionally, those skilled in the art will appreciate that one or more aspects of the invention may be implemented in hardware, software, or a combination of hardware and software. Such implementations may include a number of processors independently executing various programs and dedicated hardware or programmable hardware.

One or more program(s) of the program product 520, as well as documents thereof, may define functions of embodiments in accordance with one or more aspects of the invention and can be contained on a variety of signal-bearing media, such as computer-readable media having code, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Furthermore, such signal-bearing media may be in the form of a carrier wave or other signal propagation medium via a communication link for streaming information, including downloading all or a portion of a computer program product. Such signal-bearing media, when carrying computer-readable instructions that direct functions of one or more aspects of the invention, represent embodiments of the invention.

Accordingly, it should be appreciated that within a design instantiated in a PLD, there may be power-gated resources. These power-gated resources may be allocated into groups having different numbers of resources and these groups may be associated with different types of such resources. The number of resources within a group may be associated with a utilization level of the type of resource of the power-gated group. Thus, both fine and coarse, for example, types of power-gated groups of resources may be provided for instantiating a design in a PLD. These resources may be mapped, placed, and routed in order to obtain a lower current leakage level by increasing packing or utilization level within one or more of the power-gated groups utilized in instantiating a design. Furthermore, it should be appreciated that with this reallocation of resources, some power-gated groups may have no resources utilized as a result of instantiating a design in a PLD, and such groups having no resources utilized may be put in a standby mode or non-operative mode to reduce power consumption. Software tools used to map, place, route, or meet timing constraints may be modified to utilize power-gated groupings of resources. As mentioned above, the modes of optimization of such tools may vary, where one for example may be directed at low current leakage, and another may be directed at meeting performance, namely design timing targets.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for power-gating circuit resources of an integrated circuit, comprising:
    associating the circuit resources into sets responsive to utilization levels;
    the utilization levels being associated at least in part with how often the circuit resources are used;
    the associating including:
        providing a first set of the sets, a first number of the circuit resources in the first set being associated with a first level of utilization;
        providing a second set of the sets, a second number of the circuit resources in the second set being associated with a second level of utilization;
        the first number being less than the second number responsive to the first level of utilization being greater than the second level of utilization;
        commonly coupling the circuit resources of the first set to a first reference voltage level via a first gating circuit;
        commonly coupling the circuit resources of the second set to a second reference voltage level via a second gating circuit; and
        the second number being for coarse-grained power gating.

2. The method according to claim 1, further comprising obtaining utilization statistics to provide the levels of utilization of the circuit resources of the integrated circuit.

3. The method according to claim 1, wherein the first gating circuit and the second gating circuit are respective NMOS transistors, and wherein the first reverence voltage level and the second reference voltage level are a ground potential.

4. The method according to claim 1, wherein the first gating circuit and the second gating circuit are respective PMOS transistors, and wherein the first reverence voltage level and the second reference voltage level are a power supply potential.

5. The method according to claim 1, wherein the associating further includes grouping the circuit resources according to type to provide the first set and the second set.

6. The method according to claim 5, wherein the first reference voltage level is a ground potential and the second reference voltage level is a power supply potential.

7. The method according to claim 1, wherein the circuit resources are routing resources.

8. The method according to claim 1, wherein the sets define respective power domains of a column of resources of the integrated circuit.

9. The method according to claim 1, wherein the integrated circuit is a programmable logic device, and the circuit resources are configurable resources of the programmable logic device.

10. A method for configuring an integrated circuit having programmable resources, comprising:
    grouping portions of the programmable resources into respective power domains, the programmable resources in each power domain of the power domains being commonly coupled to a reference voltage level via a gating circuit, the portions of the programmable resources having different numbers of the programmable resources responsive to an anticipated utilization level by type of the programmable resources constituting each of the power domains;
    the anticipated utilization level being associated at least in part with how often each type of the programmable resources is used;
    the portions of the programmable resources grouped including coarse-grained power gating of at least one group thereof having a lower utilization factor;
    mapping a synthesized design using at least in part the portions of the programmable resources grouped;
    placing the portions of the programmable resources mapped; and
    determining if at least one threshold is met responsive at least in part to the power domains used to provide configuration information for instantiating the synthesized design.

11. The method according to claim 10, wherein the at least one threshold is a predefined packing threshold associated with a percentage of the programmable resources in the power domains mapped to provide the configuration information for instantiating the synthesized design.

12. The method according to claim 11, further comprising remapping the programmable resources mapped in the power domains not meeting the at least one threshold to increase the percentage of the programmable resources in the power domains meeting the threshold.

13. The method according to claim 11, further comprising remapping the programmable resources mapped in the power domains not meeting the at least one threshold to increase the percentage of the programmable resources in the power domains not meeting the threshold.

14. The method according to claim 10, wherein the at least one threshold is a predefined utilization threshold associated with a percentage of the programmable resources in the power domains placed to provide the configuration information for instantiating the synthesized design.

15. The method according to claim 14, further comprising re-placing the programmable resources placed in the power domains not meeting the at least one threshold to increase the percentage of the programmable resources in the power domains meeting the threshold.

16. The method according to claim 14, further comprising relaxing the at least one threshold to decrease the percentage of programmable resources used in at least one of the power domains in order to meeting a timing constraint.

17. A method for configuring a programmable logic device having programmable routing resources, comprising:
- mapping a synthesized design to logic resources of the programmable logic device;
- placing the logic resources mapped to associated locations of the programmable logic device;
- grouping portions of the routing resources into respective routing power domains, the routing resources in each routing power domain of the routing power domains being commonly coupled to a first reference voltage level via a first gating circuit, the portions of the routing resources having different numbers of the routing resources responsive to an anticipated utilization level by type of the routing resources constituting each of the routing power domains;
- the anticipated utilization level being associated at least in part with how often each type of the programmable resources is used;
- the portions of the programmable resources grouped including coarse-grained power gating of at least one group thereof having a lower utilization factor;
- routing the logic resources mapped and placed using at least in part the portions of the routing resources; and
- determining if a first threshold is met at least partially responsive to the routing power domains associated with the routing resources used in the routing;
- wherein configuration information for instantiating the synthesized design in the programmable logic device is provided.

18. The method according to claim 17, wherein the determining if the first threshold is met includes assigning a cost to each of the routing power domains associated with percentage of utilization of the routing resources thereof.

19. The method according to claim 17, further comprising:
- grouping portions of the logic resources into respective logic power domains, the logic resources in each logic power domain of the logic power domains being commonly coupled to a second reference voltage level via a second gating circuit, the portions of the logic resources having different numbers of the logic resources responsive to an anticipated utilization level by type of the logic resources constituting each of the logic power domains;
- the mapping of the synthesized design including using at least in part the portions of the logic resources;
- the placing using at least in part the portions of the logic resources mapped; and
- determining whether a second threshold is met at least partially responsive to at least one of the mapping and the placing of the logic power domains to provide the configuration information for instantiating the synthesized design.

20. The method according to claim 19, wherein the second threshold is one of a predefined packing threshold associated with a percentage of the logic resources in the power domains mapped to provide the configuration information for instantiation of the synthesized design, or a predefined utilization threshold associated with a percentage of the logic resources in the power domains placed to provide the configuration information for instantiation of the synthesized design.

* * * * *